May 29, 1934.  R. V. MORSE  1,960,915
ELECTRIC BRAKE
Filed June 23, 1931   4 Sheets-Sheet 1

INVENTOR.
Robert V. Morse

May 29, 1934.  R. V. MORSE  1,960,915
ELECTRIC BRAKE
Filed June 23, 1931  4 Sheets-Sheet 2

INVENTOR.
Robert V. Morse

May 29, 1934.     R. V. MORSE     1,960,915
ELECTRIC BRAKE
Filed June 23, 1931     4 Sheets-Sheet 3

INVENTOR.
Robert V. Morse

May 29, 1934. R. V. MORSE 1,960,915
ELECTRIC BRAKE
Filed June 23, 1931 4 Sheets-Sheet 4
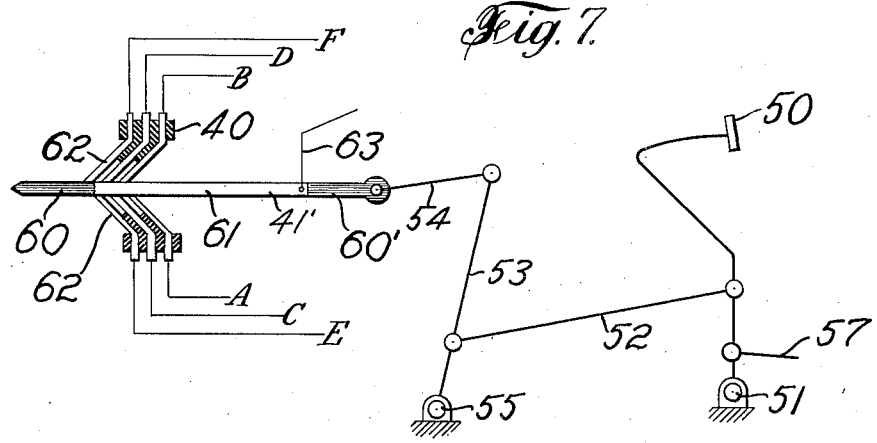
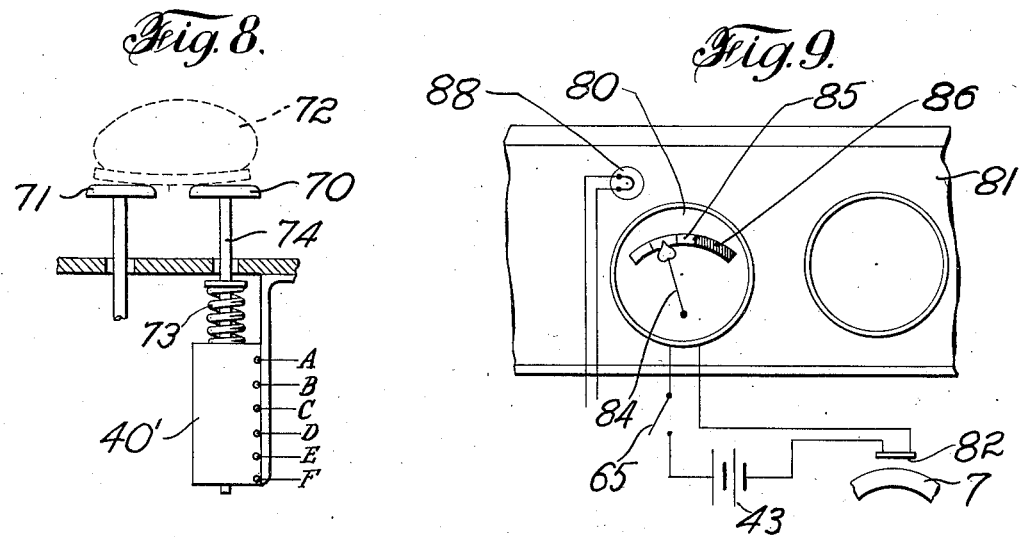
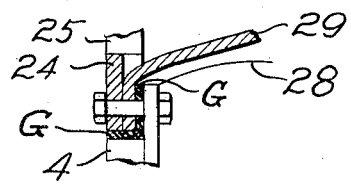
INVENTOR.
Robert V. Morse Patented May 29, 1934

1,960,915

UNITED STATES PATENT OFFICE 1,960,915

ELECTRIC BRAKE

Robert V. Morse, New York, N. Y.

Application June 23, 1931, Serial No. 546,211

5 Claims. (Cl. 188—104)

This invention relates to brakes, and especially to brakes of the type that depend on the drag or reaction of magnetic or electric forces acting thru space to retard the motion, so as not to be wholly dependent on the frictional contact of rubbing surfaces commonly found in ordinary brakes. The obvious advantages of long life and freedom from wear resulting from using magnetic drag in place of frictional contact have been recognized for half a century or more, and been the subject of numerous patents, but in spite of the various attempts to construct a practical brake, such magnetic drag brakes have never gone into extensive general use.

Such brakes have fallen into two general classes (1) the magnetic drag type in which a magnet placed near to a moving piece of iron, such as a wheel or rail, retarded the motion magnetically, or due to the more or less random eddy currents created in the iron (2) the electro-dynamic type in which a copper wound armature having a definite armature circuit, like a dynamo, was rotated in a magnetic field. The disadvantages of these types have been that they either were unduly heavy, or were liable to burn out. The magnetic drag types utilized the metal so inefficiently with its random currents that they were unduly bulky, and not suitable for any vehicle where space and weight had to be considered; and the dynamo type, with the insulated windings, could be burned out and was thus liable to fail in emergencies. Both types required heavy field excitation, with the braking effect controlled thru a rheostat, which in the case of an automobile, for example, would make a considerable drain on its storage battery.

The primary object of the present invention is to overcome these difficulties with a view to making a practical brake having the advantages inherent in the magnetic or dynamo-electric principle, but without the excessive bulk, danger of burning out, and heavy current drain which have impeded their adoption in the past. Other objects are to improve the construction and mounting of such brakes to make them suitable for use on automobiles, by making them compact, accessible, demountable, and readily adjustable as to air gap clearance, and capable of maintenance and repair by the average garage. Further objects are to guard against overheating when used at high speeds or coming down mountains, and to also guard against unintentional drag from the brakes or leaving them on too long. Another object is to improve the operation of free-wheeling transmissions. Various other objects will become apparent as the description proceeds.

Referring to the drawings:—

Figure 7 illustrates one form of foot control, connected to the brake pedal.

Figure 8 illustrates a modified form of foot control, using separate button or pedal.

Figure 9 is a view of the instrument board showing the warning indicator and signal light.

Figure 10 is a detail cross-section of a typical heat insulating gasket between the armature and the shaft or universal joint.

Figure 3:
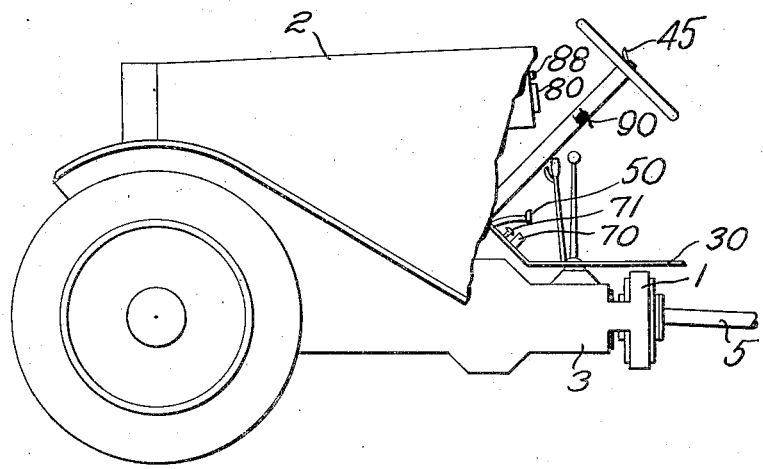
Figure 3 is a side elevation of the brake apparatus, on a smaller scale, showing also the transmission, control levers and signals on the dash of the car.

While the brake covered by the present invention may be applied to any rotating shaft, it has many features which make it especially suitable for automobiles, as shown for example in Figure 3, in which the brake 1 is shown mounted in an automobile 2 on the back of a transmission case 3 of the free-wheeling type, so as to apply its braking effect on the propeller shaft 5.

Figure 1:
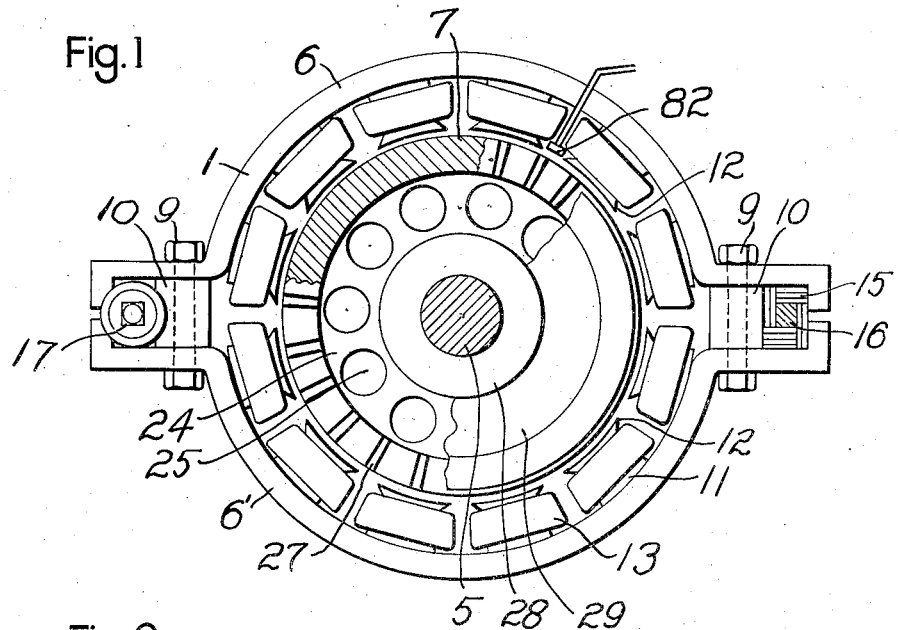
Figure 1 is a view from the rear showing the brake apparatus applied to the drive shaft of an automobile.
Figure 2:
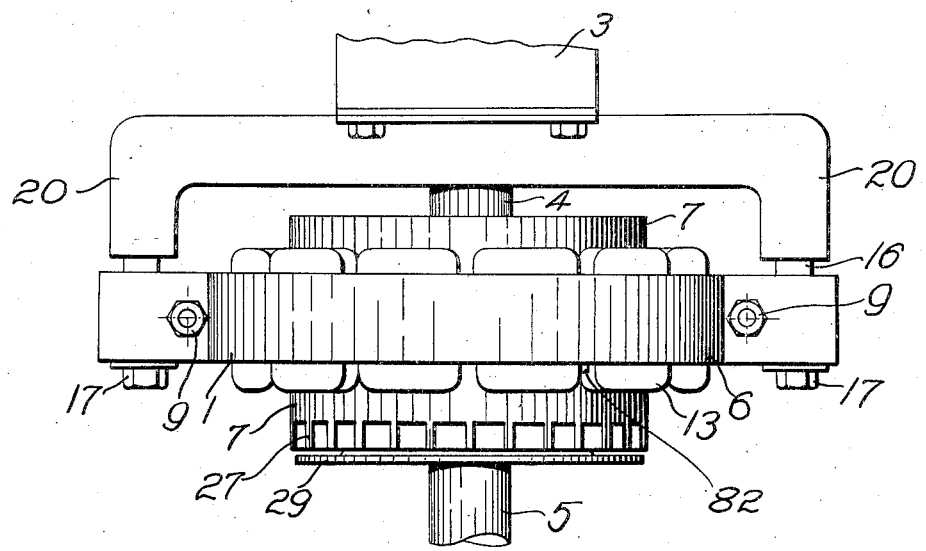
Figure 2 is a view from above of the same, showing one method of mounting on the end of the transmission case.

Referring now to Figure 1 and Figure 2, which show a typical form of the brake apparatus in greater detail, the brake apparatus in general is designated by the reference numeral 1, and has a field structure 6, 6', and an armature 7. One distinguishing feature of the present invention is that the armature has no windings, so it cannot burn out, yet armature currents are so induced and directed within it in definite paths that it has the same efficiency as a wound armature, so far as braking is concerned, as will be described later.

The field structure consists of two parts 6 and 6' of iron or steel which are bolted together by bolts 9. The bolts 9 pass thru spacing blocks 10 which hold the parts 6 and 6' the proper distance apart relative to the armature. Secured to the parts 6 and 6' are the pole pieces 11, having the pole faces 12 and the field windings or coils 13 wrapped around them. In the example shown in Figure 1 and Figure 2 there are twelve poles 12, six on the upper field structure 6 and six on the lower field structure 6'.

For maximum efficiency it is important that the air gaps between the pole faces 12 and the armature 7 be adjusted to the minimum amounts having due allowance for the expansion of the armature under heat and a suitable working clearance. This adjustment, and also means for ready assembly and disassembly, are provided by shims 15 which are inserted between the spacing blocks 10 on all four sides of square supporting pins 16, as shown for example at the right hand side of Figure 1 where the nut and washer 17 (see the left hand side of Figure 1) are shown removed from the supporting pin 16 to expose the shims 15. Similar shims 15, supporting pins 16, and nuts and washers 17 are used on both sides of the brake structure, and as the shims 15 are above, below, and on both sides of the supporting pins 16 it will be evident that the field structure can be shifted in any direction by merely inserting or removing shims, so as to center the pole faces 12 relative to the armature 7, and the amount of clearance or air gap can be adjusted by these shims and by changing the thickness of the spacing blocks or shims 10.

The square supporting pins 16 are carried by a bracket 20 which is mounted on the rear of the transmission gear box 3, as shown in Figure 2 and Figure 3. Of course it may be desirable in certain installations to make the field structure 6, 6' integral with the bracket or end of the gear box as shown for example in Figure 3, but the means described are generally preferable in that they permit adjustment.

Figure 4:
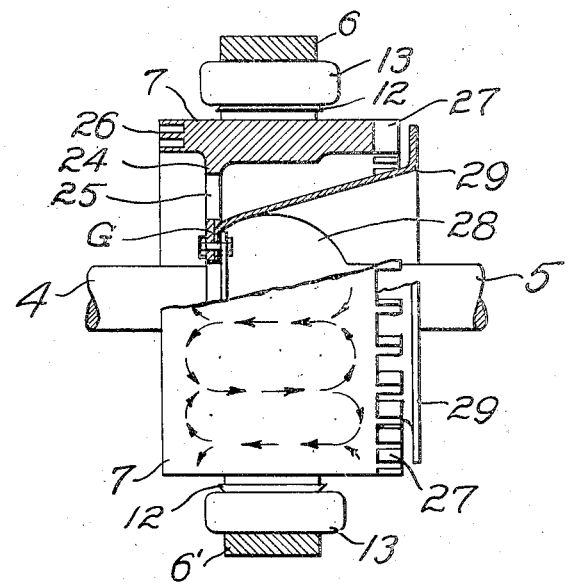
Figure 4 is a cross-section view of the armature and field poles.

Referring now to Figure 4 as well as Figure 1 and Figure 2, the armature 7 consists of an annular ring of steel or iron, mounted on a spider 24, which is provided with holes 25 or other openings as between spokes, thru which a current of air can circulate, in order that the armature ring may not heat up the shaft 4, to which it is attached. The armature ring 7 is also preferably provided with cooling ribs 26 and fan blades 27 on its rim, which draw the air over the cooling ribs 26, thru the spoke spaces or holes 25, and out thru openings or blades 27. The drive shaft 4 is connected to the propeller shaft 5 by means of the usual universal joint 28. A spun metal guide or shield 29 directs the flow of cooling air thru the spoke holes 25 and out thru the fan 27, and shields the universal joint 28 from the heat of the armature, which may operate at high temperatures. The manner of mounting the shield 29, at the junction of the spider 24 and universal joint 28, allows the shield 29 to carry off and dissipate much of the heat coming thru the spider 24 before it reaches the universal joint 28, and a heat insulating gasket G (see Figure 10) of asbestos or other suitable material may also be provided. The spider 24 may be mounted directly on the shaft 4, if desired, but the use of a heat insulating mounting such as shown in Fig. 10 is preferable.

Figure 6:
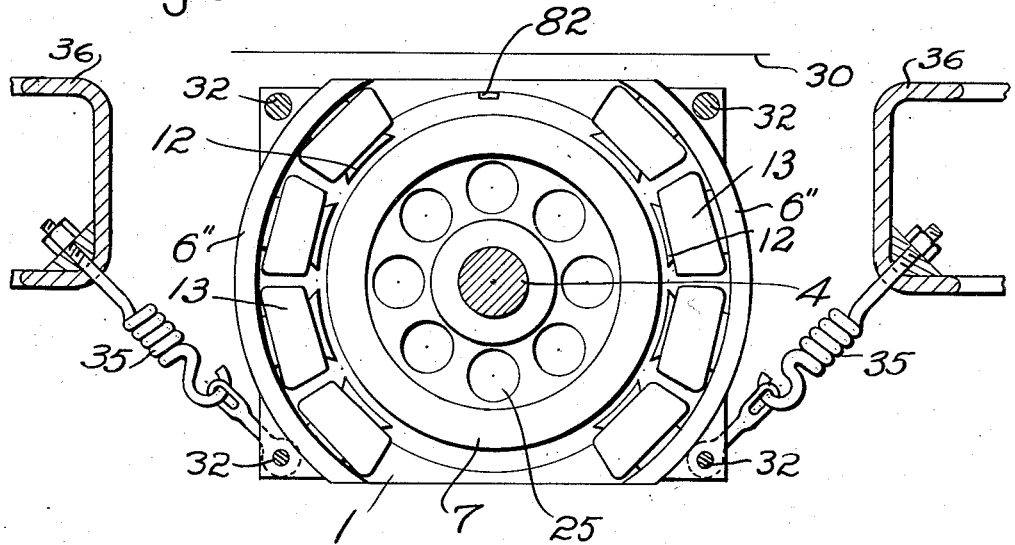
Figure 6 shows a modification which disposes the bulk of the brake more advantageously in relation to the height of the car.

The old iron drag armatures have been too bulky and inefficient to be practical and the copper wound armatures have burned out. In order to overcome these difficulties I have used an iron or steel armature without copper windings, (so that it can not burn out), but have forced the induced electric currents to flow thru the solid iron or steel of the armature in equally efficient paths, back and forth across the armature, substantially as they would have flowed had copper circuits been used. This is shown by the arrows in Figure 4 in which it will be seen that the pole faces 12 extend substantially across the armature in an axial direction and are closely spaced circumferentially as shown in Figure 1 and Figure 6. Adjacent pole faces 12 are of opposite polarity, and as the armature rotates heavy currents are induced in the armature, owing to its low resistance. These currents flow as shown diagrammatically by arrows in Figure 4, to the right under pole pieces of one polarity and to the left under those of the opposite polarity, so that they loop or zig-zag back and forth in the annular armature, filling it with closely spaced directed currents of high intensity which create a powerful braking reaction.

By positively directing the current in efficient and closely spaced circuits, as distinguished from the haphazard "eddy currents" and "magnetic drags" of the older constructions, a solid non-burnable armature is obtained which compares favorably with a dynamo, so far as braking is concerned, since the slight increased resistance of iron is not undesirable when there is no external circuit.

In Figure 6 a modified form is shown in which the armature 7 is the same but the field structure 6'' is arranged so that the pole faces 12 do not extend all around the armature, but are omitted at the top and bottom. This construction has advantages in certain automobile installations, where the distance from the shaft 4 to the floor level 30 is limited, in that it permits the use of a maximum size armature and full size pole pieces, and so gives a more effective brake than if the circumferential construction were used. The field structure 6'' is bolted to a face plate or suitable bosses on the back of the transmission gear box by means of the bolts 32, which may allow a slight amount of adjustment; or the field structure may be non-adjustably or integrally secured to the back of the transmission box as shown in Figure 3.

The type of adjustable field structure mounting described with adjusting shims 15 or bolts, while suitable for special jobs and high priced cars, is not so well adapted to quantity production as the integral or non-adjustable field bracket mounting. The manner of mounting varies of course in different installations according to the characteristics of the car. While I have shown the field structure secured to the rear of the transmission gear box, in order that it may be accurately centered with the drive shaft, yet in many cases it is desirable to also partially support as by the spring rods 35 the field structure 6 from cross members 36 of the chassis frame, where such are available. The cross members may be either straight transverse or in the X or diagonal form, both forms being common in the art. In general, however, it is better to support the brake wholly from the rear of the transmission gear box, to insure exact alignment, and to only use additional or supplementary supports in special cases where the overhang or weight is excessive.

In brakes of the general type described the braking force is regulated and controlled by varying the magnetic field to which the armature is exposed. This is generally done by means of a rheostat in series with the field coils, so that the voltage applied to them may be varied from a slight amount up to full voltage. Under such conditions all the field coils are energized together, either slightly or powerfully as desired. The brake covered by the present invention may be controlled in that manner if desired, but such control on any such brake has the disadvantage that the current flowing thru the rheostat dissipates its energy uselessly as heat, and also it is somewhat difficult to get evenly graduated increments of braking effect.

Therefore in my improved form I do not vary the current strength in the field coils, nor the magnetic saturation of the pole faces, but wire the individual pole pieces independently, and throw them into action successively, each to its full strength, so that for example with twelve poles, two poles in action give light braking, and for increased braking by steps four poles, six poles, eight poles, ten poles, and for maximum twelve poles are thrown into action. In this manner no rheostats are required, the current in a given pole is either full on or full off, perfectly even gradations are obtained, and greater reliability also results because of the independent circuits used, whereas the break of a single wire anywhere will cause the old system to cease to function.

Figure 5:
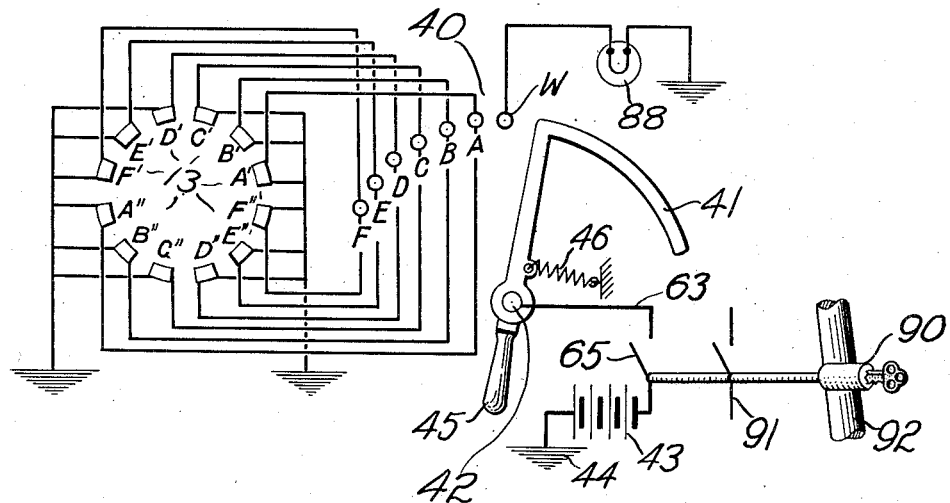
Figure 5 is a typical wiring control diagram, showing the manner of varying the strength of the braking effect, and a coincidental lock.

An example of the independent successive pole wiring is shown in Figure 5, in which a field structure having twelve field coils 13 and a controller 40 having six operative positions or contacts A, B, C, D, E and F are shown. A brush or wiping contact 41, shown for example in the form of a segment, is pivoted at 42, and may be moved to make electrical contact with as many of the contacts A, B, C, D, E, F as desired. The wiper 41 is connected to a source of electric energy, such as the storage battery 43, whose other side is grounded at 44. The wiper 41 may be operated by a handle 45, or by linkages connected to the brake pedal or a foot button as will be described. A return spring 46 is preferably provided, so that the controller will work back to the "off" position when the handle 45 is released.

When the wiper 41 is brought over the contact A, the field coils 13 marked A′ and A″ are energized, the circuit being from the control contact A to the field coils A′ and A″ and then to ground, which with the connection of the wiper 41 to battery 43 and ground 44 completes the circuit. It will be noted that the field coils A′ and A″ are located on opposite sides of the armature 7; this is in order that the magnetic attraction on the armature shall be equalized, so as not to load the bearings unduly. If the wiper 41 is advanced to cover the position B the fields marked B′ and B″ are also added to the energized circuit, as will be evident from the diagram, and so on until when the wiper 41 of the controller is moved to the final position F, all the field coils are energized.

While I have shown a segmental wiper, it will be understood that it is merely for purposes of illustration, and that any switch or contact mechanism may be used which accumulates successive contacts, so that successive groups of field coils may be thrown into action until the desired amount of braking effect is built up. The method is in general distinguished from rheostat control in that control is not so much varied by varying the intensity of the magnetic flux in a given field, as by throwing into action additional fields, each of which is strongly energized. Thus a rheostat may be dispensed with, if desired, or used only for minor variations. While the wiring diagram looks complicated, it will be understood that the wires can be carried from the controller in a single cable, so that in practice the system combines simplicity, reliability, (due to independent field circuits), efficiency, and positive steps or increments in braking. While I have shown six such steps or increments, it will be understood that any other desired number of steps may be used, as will be evident to those skilled in the art, by changing the number of poles or groups of poles, and altering the wiring and contacts accordingly.

In place of, or in conjunction with a hand control, the brake may be controlled by the foot thru the regular brake pedal of an automobile, in the following manner. The ordinary brake pedal of an automobile has a travel of about five or six inches, of which about the first inch is either slack or used in taking up the play in linkage and brake bands before the brake bands actually make contact with the brake drums. I utilize this preliminary travel of the brake pedal of an automobile to operate the control mechanism of the electro-magnetic brake, so that the later brake, which is non-frictional, may be applied without applying the regular frictional brakes, or only applying them slightly. Further pressure on the brake pedal applies the frictional brakes in the usual way, with the addition of the non-frictional brake full on; or if desired the mechanism can be arranged so that the non-frictional brake is gradually cut out as the brake is pressed further down. By thus controlling the non-frictional brake by the first stages of movement of the brake pedal, so that it is full on when the pedal is only slightly or partially pressed down, there is no change required in the driving habits of the operator, as the car is controlled by the usual levers but in a more effective and safer way.

One illustrative mechanism for this pedal control is shown in Figure 7, in which the brake pedal 50 of an automobile is shown pivoted at 51, and connected by the multiplying linkage 52, 53, 54 to the controller 40. The particular form of linkage will of course vary in different installations, and the form illustrated by way of example in Figure 7 consists of a link 52 connected to the brake pedal 50, and connected at its other end to the lever 53 which is pivoted at 55. To the other end of the lever 53 is attached the link 54 which connects to the wiper bar 41′ of the controller 40. The point of connection of the link 52 to the lever 53 is nearer to the pivot 55 than to the other end of the lever 53, so that the lever 53 acts as a multiplying lever, which is generally desirable in such installations. The link 57 operates the usual friction brakes.

The controller 40 in the form illustrated in Figure 7 has a wiper bar 41′, (corresponding to the wiper 41 of Figure 5), which in this case is straight and provided with an insulated portion 60 and a conducting portion 61. The wiper 41′ slides between six spring metal brushes 62 which are arranged three on each side of the wiper 41′. The brushes 62 are insulated from each other and are connected to the wires A, B, C, D, E, F leading to the field coils as described in connection with Figure 5. The current is led into the wiper thru the connection 63 which comes from the battery 43 (see Figure 5) or other suitable source of electrical energy.

When the brake pedal 50 is up, the wiper 41′ is withdrawn to the right, so that the insulated portion 60 of the wiper 41′ lies between the brushes 62. When the brake pedal 50 is depressed slightly the linkage 52, 53, 54 moves the wiper 41' to the left and brings the conducting portion 61 into contact with the brushes 62, one after the other, so that as the movement is continued, all the circuits are energized. Further movement of the brake pedal 50, when the regular frictional brakes are applied, merely moves the wiper 41' further, without breaking the electrical contacts, as the conducting portion of the wiper 61 is made sufficiently long to allow for such over-travel. If it is thought desirable to design the apparatus so that the non-frictional brake will be cut out as the frictional brake is applied, the length of the conducting portion 61 can be reduced and the length of the insulating portion 60' can be extended to accomplish that result.

It will be noted that the brushes 62 are staggered, so that they may be compactly arranged, and so that one brush will pick up directly after another.

If desired, a separate brake pedal or foot-button may be used, either as an alternative for, or in addition to the methods of applying the brake already described. Such a foot button is a convenience, even though a connection to the regular pedal 50 is also provided, for with a brake button located close to the accelerator button a slight motion of the toe is all that is required to control both acceleration and deceleration.

Such a foot button is illustrated in Figure 8, and consists of a foot rest, pedal or button 70 mounted close to and to the right of the accelerator pedal 71 of the automobile, so that the operator's foot 72 (indicated in cross section in broken lines) may rest upon the button 70 as a foot rest in operating the accelerator pedal 71. In order to permit this, the brake button 70 is provided with a spring 73 which is considerably stronger and more resistant than the corresponding spring of the accelerator pedal 71. The brake pedal 70 is connected by the shaft 74 to a control box 40', which is in general similar to the controller 40 previously described, except that it can be more compact as no provision for over-travel is required. If desired, a multiplying linkage such as shown in Figure 7 may be provided between the pedal 70 and controller 40.

The method of operation is as follows. In ordinary driving the operator's foot 72 rests partly on the brake button 70 and pushes the accelerator button 71, which only has a light resistance; in other words, the operator drives in the ordinary manner, since the brake button 70 is sufficiently stiff to act as a foot rest. For full speed the operator can slip his foot from the brake button 70 and press the accelerator button 71 all the way down, in the usual manner. To apply the brake for deceleration, the operator merely shifts his toe slightly to the right and presses down the brake button 70, while the accelerator button 71 is released. Acceleration and deceleration are thus under instant control, with a minimum of muscular movement. If it is not desired to use the button 70 as a foot-rest, it can of course be located further away from the accelerator pedal 71.

Where a hand control and a foot control are both provided, they may be interlinked if desired in the manner of the ordinary throttle control, but I prefer to use separate control boxes, whether or not the hand control is self returning.

The prolonged use of the brake will generate considerable heat in the armature 7, due to the heavy currents flowing back and forth in the armature. The cooling blades 27 of course help to dissipate the heat, and the construction of the air cooled spider 24 (see Figure 4) helps prevent the heat from reaching the shaft bearings. However, it is absolutely essential that the iron armature 7 be not allowed to reach the critical temperature, around a bright red heat, at which it loses its magnetic permeability. To guard against any such possibility a warning indicator is provided.

This warning indicator 80 is shown in Figure 9, mounted on the instrument board 81 of the car where the driver may see it. It is on the principle of a heat indicator of the electrical type, but it is undesirable to bring its thermo-couple or resistance thermal unit 82 in direct contact with the rotating armature 7, as it would involve brushes, frictional contacts, and danger of burning out. I have found that this can be avoided by placing the thermal receiving unit 82 close to the armature 7 but not in contact therewith, as for example, between the pole pieces 12 and about the distance of the air gap away from the armature. Though of course the unit 82 does not receive the actual temperature of the armature 7, yet it does heat up approximately in proportion thereto, and by observing the reading registered by the hand 84 in the scale 85 when the temperature of the armature 7 is close to the danger point, the scale or dial 85 may be calibrated sufficiently to act as a warning signal. The scale 85 may be calibrated with arbitrary marks or numbers, and the right hand position 86 where the danger zone is located may be colored red or marked "Danger". Such electrical indicators, if of the thermo-resistance type, are generally operated from the storage battery 43 and are connected to the master switch 65 of the car, so as to draw no current when the car is locked. If the indicator is of the true thermo-couple type, the battery 43 and switch 65 are not required.

The current required by an electrical brake constitutes a serious load on a storage battery if the electrical brake is left on when the car is standing still. To guard against this being done inadvertently a warning light 88 may also be mounted on the instrument board 81 of the car, this warning light 88 being connected thru contact W as shown in Figure 5, so as to throw on the light 88 whenever the brake is on. This also gives warning if the brake is dragging while running.

As a final assurance that the electric brake will not be left on inadvertently, I have connected the main lead wire 63 to the master switch 65 operated by the coincidental lock 90 now usually found in cars, which locks the ignition 91, and steering post 92 or transmission gear bar, depending on the type employed. Thus the circuit between the storage battery and the electric brake will be definitely interrupted when the car is locked. As the steering gear or transmission must be unlocked when the car is operated, which also puts the electric brake in condition for operation, there is no danger that the operator will forget to unlock the brake when starting.

The electric brake described is shown combined with a transmission gear case 3 of the free-wheeling type, for the reason that such a combination solves a serious problem in relation to free-wheeling transmission. The advantage of free-wheeling in permitting the car to travel at speed while the engine idles is well known, but in the hands of the average driver this tends to cause considerably increased wear on the brakes, which must absorb the braking effect otherwise given by the engine. By combining a free-wheeling transmission with an electric brake of the non-friction, non-wearing type such as described an ideal driving combination is obtained, which allows the operator to accelerate, free-wheel, and decelerate with ease and safety, and brings out to the full advantages of the free-wheeling transmission while eliminating the serious disadvantage of increased brake wear which has heretofore been associated with it. While I have shown the electric brake combined with a free-wheeling type of transmission because of the special advantages inherent in that combination, the brake may also of course be applied to transmissions of the ordinary or non-freewheeling type if desired.

While I have in the foregoing described certain specific examples, it will be understood that they are merely for purposes of illustration to make clear the principles of the invention, which is not limited to the particular form shown, and is susceptible to various modifications and adaptations in different installations as will be apparent to those skilled in the art without departing from the scope of the invention as stated in the following claims.

I claim:—

1. In an electric brake, the combination of a cylindrical annular armature of magnetic metal, said metal being used both for the magnetic flux and as an electric conductor of induced armature currents, a shaft, an air-cooled spider connecting said armature to said shaft, a field structure having pole pieces of alternate polarity arranged to induce electric currents axially in the armature in closely spaced circuits to produce a braking effect, means for exciting opposite poles simultaneously to give balanced magnetic forces, and means for exciting said balanced poles successively to vary the amount of the braking effect.

2. In an electric brake the combination of a cylindrical annular armature, a shaft, a field structure having pole pieces closely spaced on both sides of the armature, and means for exciting various pole pieces successively to substantially their full voltage, to vary the amount of the braking effect in definite steps.

3. In an electric brake, the combination of an armature adapted to operate at high temperatures, said armature being of magnetic metal which is used both for magnetic flux and as an electrical conductor of induced armature currents, a shaft, heat insulating material interposed between said armature and shaft, and a field structure having pole pieces arranged to induce electrical currents in the armature to produce a braking effect, and means for controlling the amount of excitation in said field structure to vary the braking effect.

4. In a braking system, the combination of an electric brake comprising an armature and a field structure having field poles arranged to produce a braking effect by currents induced in said armature, a pedal, and a controller operated by said pedal, said controller being arranged to energize some of the field poles substantially fully before energizing others, whereby the braking effect is built up in steps by bringing in poles.

5. In an electric brake, the combination of a shaft, a cylindrical annular armature adapted to operate at high temperature and constructed of magnetic metal, said metal being used both for the magnetic flux and as an electrical conductor of induced armature currents, said armature being mounted on said shaft by means of a spider having openings thru which cooling air may flow, heat insulating material between said armature and said shaft, a field structure having pole pieces closely spaced and arranged to induce electric currents axially in the armature in closely spaced circuits to produce a braking effect, and means for controlling the amount of excitation in said field structure to vary the braking effect.

ROBERT V. MORSE.